United States Patent [19]
Yribarren

[11] Patent Number: 5,997,975
[45] Date of Patent: Dec. 7, 1999

[54] DEVICE FOR RESISTING ADHESION

[76] Inventor: Richard J. Yribarren, P.O. Box 55, Tranquility, Calif. 93668

[21] Appl. No.: 08/890,295

[22] Filed: Jul. 9, 1997

[51] Int. Cl.$^6$ .............................. B32B 3/02; A01D 46/14
[52] U.S. Cl. ...................... 428/64.1; 428/66.6; 428/172; 56/36; 56/40
[58] Field of Search ..................................... 428/174, 167, 428/192, 172, 64.1, 66.2, 66.6, 66.7, 101, 120, 137; 56/28, 36, 40

[56] References Cited

U.S. PATENT DOCUMENTS

| | | | |
|---|---|---|---|
| 3,161,210 | 12/1964 | Lööf | 428/167 |
| 4,394,412 | 7/1983 | Yamamoto et al. | 428/174 |
| 5,466,510 | 11/1995 | Oikawa et al. | 428/172 |

*Primary Examiner*—Donald Loney
*Attorney, Agent, or Firm*—Worrel & Worrel

[57] ABSTRACT

An apparatus for resisting adhesion by materials on a movable assembly, the apparatus having a body member adapted to be mounted on the movable assembly at a position susceptible to the adhesion and which is so constructed as to be capable of incurring contact from the materials substantially without the adhesion resulting from such contact.

14 Claims, 3 Drawing Sheets

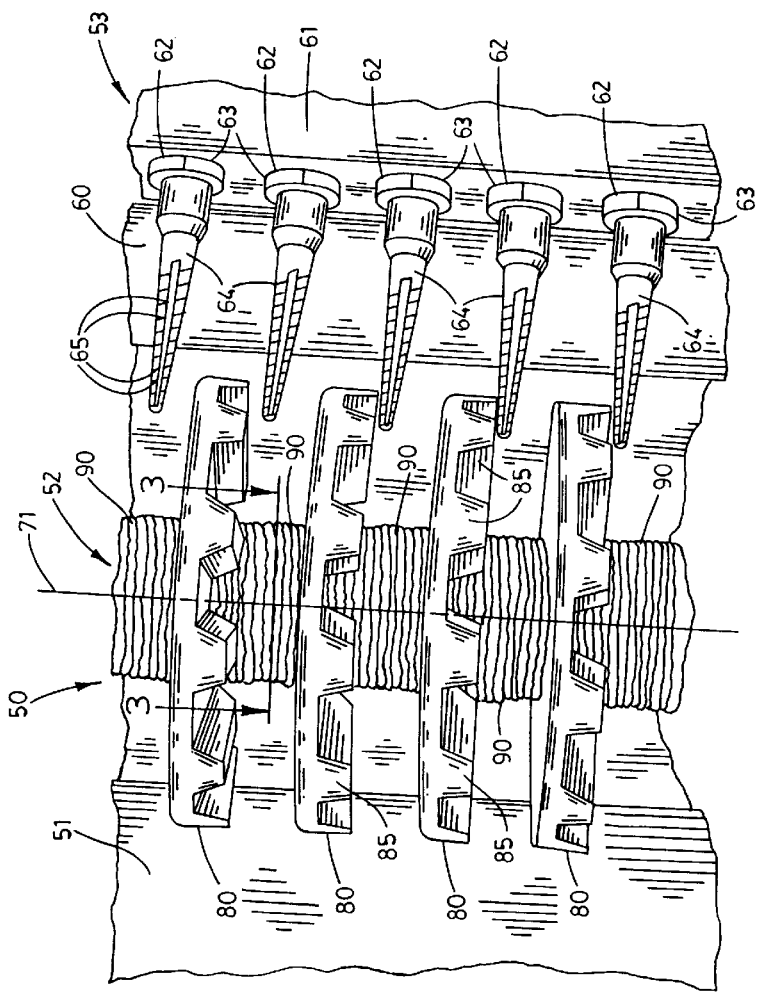
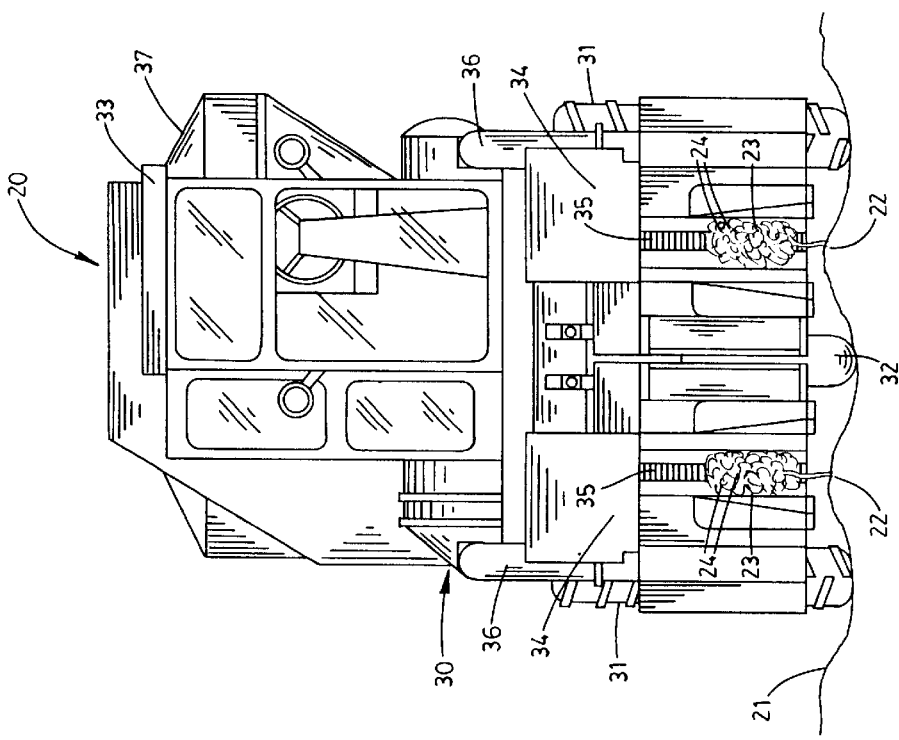
FIG. 2
FIG. 1

DEVICE FOR RESISTING ADHESION

BACKGROUND OF THE INVENTION

1. Field of the Invention

The present invention relates to a device for resisting adhesion and, more particularly, to such a device which is particularly well suited to resisting entanglement by fibrous material in mechanical devices.

2. Description of the Prior Art

There is a multitude of situations in which mechanical devices, and particularly a variety of types of machinery, are subjected during normal operation to being compromised by materials with which they come into contact. Frequently, this includes materials which the machinery is specifically designed to handle. In these instances, the machines are subject to being compromised, in one way or another, by residual materials which would otherwise constitute waste, but which adhere to the operating equipment in such a manner as to interfere with normal operation. Typically, this condition requires that such residual material periodically be removed from operating equipment to avoid the adverse consequences thereof. Such maintenance results in substantial labor, down time and a corresponding cost which, over time, may become prohibitively expensive.

For example, mechanized harvesters typically must handle fibrous materials in performing their harvesting operations. However, the residual material from the crop being harvested tends to collect in the operating machinery and to become entangled in the moving parts thereof. Over time, the entangled fibers interfere with the operation of the machinery and must be removed. In the case of cotton harvesters, barbed spindles are employed in multiples to remove the cotton fiber from the cotton plants. The cotton fibers are removed from the spindles by doffer plates arranged in stands, or stacks, of such doffer plates. Within the stack, adjacent doffer plates are separated by spacers which may be constructed as an integral part of each doffer plate, or be separate therefrom. The spacers, with the doffer plates, are rotated about a longitudinal axis with a drive shaft. Conventionally, such spacers are of metal construction. Over time, cotton fiber begins to adhere to the exterior surfaces of the spacers. As operation continues, this entanglement of cotton fiber, or "wrap" as it has come to be known, more rapidly develops.

Ultimately, operation of the harvester should be terminated for removal of the wrap. Various methods are conventionally used to remove the wrap including using various hand tools to pull or cut the fibers for removal of the wrap. Typically this maintenance operation may be required after ten (10) to twelve (12) hours of operation and may, itself, take a lengthy period of time to complete, depending upon the extent of the build up. As a consequence, the harvester is out of operation for a significant period of time. This is expensive, both in terms of labor, as well as because of the down time necessarily involved.

There has not heretofore been a means for avoiding this condition and, as a consequence, the condition has been considered a necessary, but tedious and expensive, part of the maintenance of such machinery.

Therefore, it has long been known that it would be desirable to have a device for resisting adhesion which is particularly well suited to avoiding or, at very least, minimizing the entanglement of fibrous materials about the moving parts of machinery, such as mechanical devices adapted to handle such fibrous material; which has particular application in use on harvesting equipment such as that employed in the harvesting of cotton; which operates simply and inexpensively to resist adhesion by fibrous material; which, depending upon the particular embodiment involved, employs a plurality of operative means to achieve the desired result; which does not interfere with the normal operation of such machinery; and which is otherwise entirely well suited to achieving its operational results.

SUMMARY OF THE INVENTION

Therefore, it is an object of the present invention to provide an improved device for resisting adhesion which has particular utility to usage in mechanical devices, such as heavy machinery.

Another object is to provide such a device which has application to use in a wide variety of types of mechanical devices, including heavy machinery, wherein a plurality of moving parts necessary for the operation and use of the machinery is subject to entanglement in portions of the material being handled, or otherwise processed.

Another object is to provide such a device which is particularly well suited to usage in mechanical harvesting equipment, such as cotton harvesters, wherein the work material handling assemblies are chronically susceptible to being encumbered by residual work material during operation.

Another object is to provide such a device which is entirely compatible with the otherwise conventional structures of such mechanical devices interoperating therewith in an otherwise conventional fashion, but avoiding the undesirable side effects of conventional operation.

Another object is to provide such a device which is operable substantially to eliminate the down time conventionally required in the use of such equipment by substantially completely eliminating the deleterious side effect involved in conventional operation using such mechanical devices.

Another object is to provide such a device which can effectively be used in new machinery, as well as being uniquely adapted for retrofitting in existing machinery substantially without any significant down time.

Another object is to provide such a device which is fully adaptable for use on a wide variety of types of machinery with little or no adaptation to the particular environment of use and at a cost which is of negligible consideration.

Further objects and advantages are to provide improved elements and arrangements thereof in a device for the purpose described which is dependable, economical, durable and fully effective in accomplishing its intended purposes.

These and other objects and advantages are achieved, in the preferred embodiment of the present invention, in a device for resisting adhesion by materials on a movable assembly, the device having a body member adapted to be mounted on the movable assembly at a position susceptible to adhesion and which is so constructed as to be capable of incurring contact from the predetermined materials substantially without adhesion resulting from such contact.

BRIEF DESCRIPTION OF THE DRAWINGS

FIG. 1 is a front elevation of a conventional mechanical cotton harvester illustrating one environment of use of the device of the present invention.

FIG. 2 is a substantially enlarged, fragmentary perspective view of the interior of a conventional picking head of a cotton harvester illustrating a conventional condition in the use of such cotton harvesters wherein cotton fiber has become entangled in the operative portions thereof, or more specifically, the doffer assembly.

DESCRIPTION OF THE PREFERRED EMBODIMENT

Figure 4:
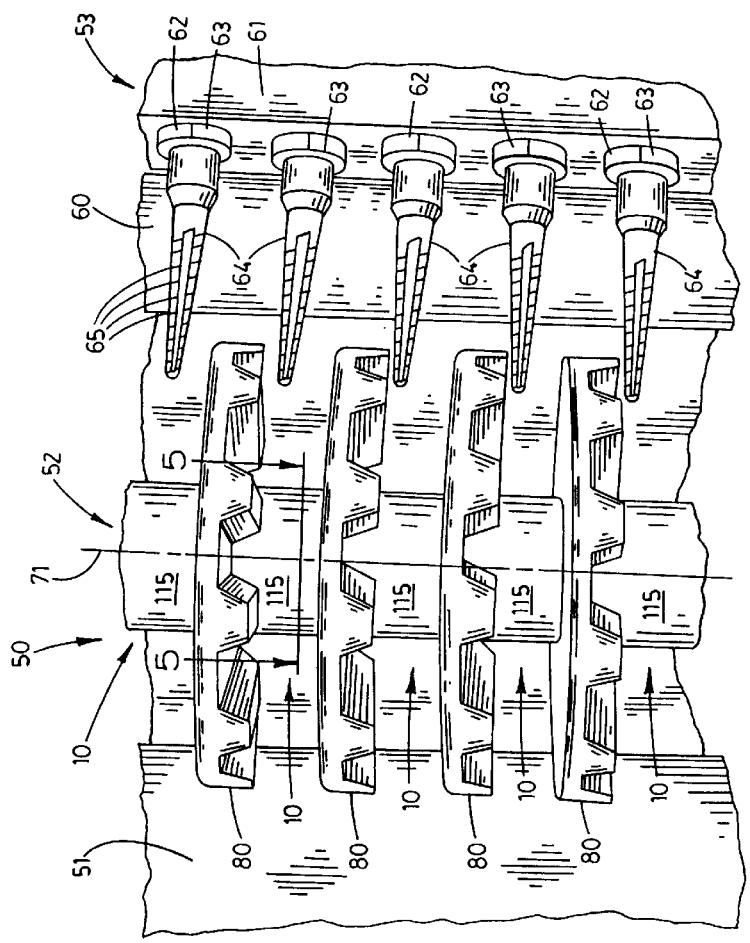
FIG. 4 is a substantially enlarged, fragmentary view of the interior of a picking head of a conventional cotton harvester, but mounting a plurality of the devices of the present invention illustrating, in contrast to FIG. 2, the lack of entanglement of cotton fiber in the doffer assembly thereof.

Referring more particularly to the drawings, the device of the present invention is generally indicated by the numeral 10 in FIG. 4. As will become more clearly apparent, the device of the present invention has application to resisting adhesion in mechanical devices in a virtually limitless number of operative environments.

An operational environment within which the device 10 of the present invention is particularly well suited for usage is illustrated in the drawings. More specifically, a mechanical cotton harvester is generally indicated by the numeral 20 in FIG. 1. As shown therein, the earth's surface is indicated at 21 in which are planted rows of cotton plants 22. Each row of cotton plants contains a plurality of individual cotton plants 23 each bearing a multiplicity of cotton bolls 24 from which cotton fiber is to be harvested using the mechanical cotton harvester 20.

Referring more particularly to the mechanical cotton harvester 20, it may be visualized in FIG. 1 generally as having a body 30 having front wheels 31 and a rear wheel 32. It will be understood that, except as otherwise specified herein with respect to the device of the present invention, the cotton harvester 20 is entirely conventional. Thus, the cotton harvester has a driver's compartment 33 in which the operator sits while operating the cotton harvester. The cotton harvester 20, as shown in FIG. 1 for illustrative convenience, has a pair of picking heads 34, but conventional cotton harvesters can have any desired number of picking heads. It will be understood that each picking head is aligned with a row of cotton plants 22 and, during operation, passes over and along the row so that the cotton plants pass in relative movement through the picking head. During such passage, the cotton fibers are removed from the cotton bolls of the cotton plants.

Accordingly, each picking head 34 has an entrance 35 leading inwardly to the internal working components thereof. Each picking head communicates with an air duct 36 which, during normal operation, delivers the harvested cotton fiber into a picker basket 37. More specifically, the picking heads 34 harvest the cotton fiber from the cotton bolls of the cotton plants and the air ducts 36 vacummatically capture the harvested cotton fiber and transport the cotton fiber upwardly to, and deposit the cotton fiber in, the picker basket 37.

It will be understood that the picking heads 34 are substantially identical except that their interior operating components therewithin are substantially mirror images of each other. For illustrative convenience, the picking head on the right, as viewed in FIG. 1, will be described as illustrative of both picking heads 34. The picking head has an interior 50 which is bounded by interior wall 51. Within the interior of the picking head is a doffer stand or assembly 52 which operates in conjunction with a picking drum assembly 53, both of which are fragmentarily shown in FIGS. 2 through 6.

The picking drum assembly 53 of the picking head 34 has a picking drum 60 of substantially cylindrical construction which, during operation, is driven by a drive mechanism, not shown, in rotational movement about a substantially vertical axis. A plurality of picking bars 61 are mounted on the exterior of the picking drum in substantially vertical, spaced relation extending substantially radially outward therefrom. One of the picking bars is visible in FIGS. 2 and 4. Each of the picking bars mounts a plurality of spindle assemblies 62 disposed in spaced relation therealong, as best shown in FIGS. 2 and 4. Each of the spindle assemblies has a spindle bearing 63 in which is mounted a spindle 64 driven in rotational movement about a horizontal longitudinal axis which is substantially right-angularly related, to the vertical axis of rotation of the picking drum. Each of the spindles is machined to provide a plurality of barbs 65 thereon employed, as hereinafter described, in capturing the cotton fiber from the cotton bolls 24 as the cotton plants pass in relative movement through the picking head.

Figure 6:
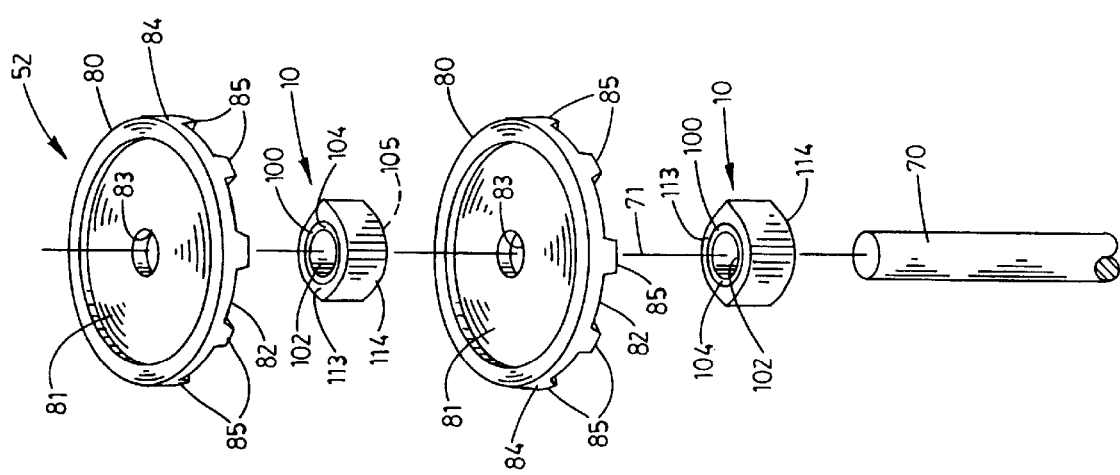
FIG. 6 is a somewhat reduced, fragmentary exploded, perspective view of a portion of a doffer assembly showing two (2) of the devices of the present invention in position for assembly into an operative configuration.

The doffer stand or assembly 52 within the picking head 34 has a mounting shaft 70, shown in FIG. 6, mounted for driven rotational movement by a drive mechanism, not shown, about a vertical axis of rotation 71. In the conventional construction shown in FIGS. 2 and 3, conventional spacing sleeves 72 are mounted on the mounting shaft, as hereinafter described. Each of the conventional spacing sleeves has a cylindrical exterior surface 73 and an internal passage 74 which is typically slip fitted about the mounting shaft 70.

Between each pair of conventional spacing sleeves 72 is mounted a doffer pad or plate 80. The doffer plate, sometimes referred to in the art as a "duffer plate," is typically constructed of synthetic plastic or rubber. Thus, as can be visualized in FIGS. 2 and 3, the doffer assembly is composed of the mounting shaft 70 on which are mounted a plurality of alternate spacing sleeves and doffer plates. The spacing sleeves and doffer plates are captured endwardly on the mounting shaft so that they constitute an integral unit therewith and are rotated with the mounting shaft 70 about the axis of rotation 71 during normal operation. Each of the doffer plates has an upper surface 81 and an opposite lower surface 82. Each of the doffer plates has a shaft passage 83 which is slip fitted about the mounting shaft and a peripheral surface 84 concentric, in the assembled configuration, to the axis of rotation 71. The lower surface 82 of the doffer plate mounts a plurality of duffer ribs 85 which extend radially on the lower surface thereof to the peripheral surface of the doffer plate and in spaced relation to each other.

Figure 3:
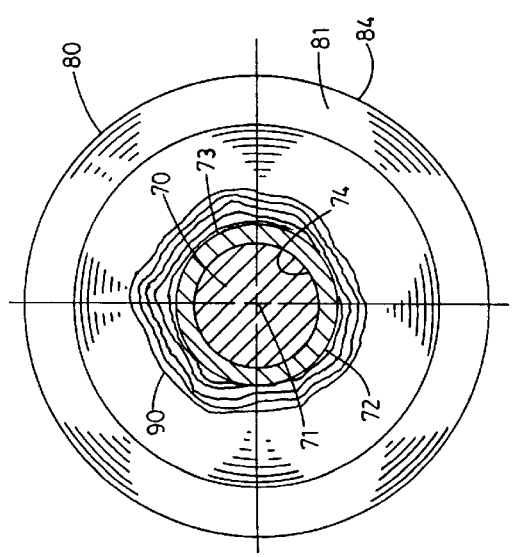
FIG. 3 is a horizontal section taken on line 3—3 in FIG. 2.

As shown for illustrative convenience in FIGS. 2 and 3, over a period of operation of a conventional doffer assembly 52, cotton fiber adheres to, and becomes entangled about, the conventional spacing sleeves 72 of the doffer assembly forming what is known as wrap 90. This wrap interferes with normal operation of the doffer assembly and periodically should be removed for continued optimum operation of the cotton harvester.

Figure 5:
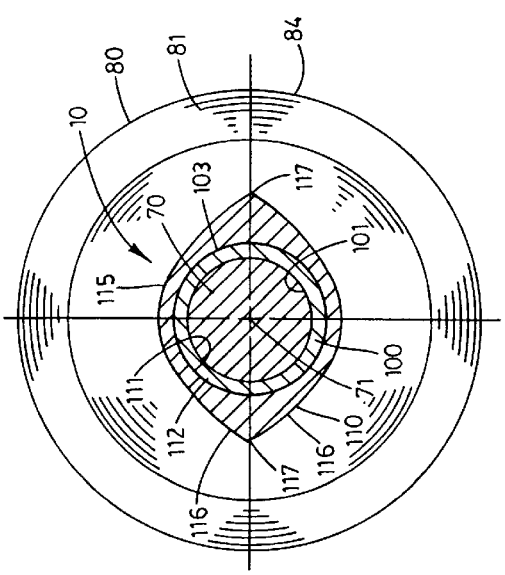
FIG. 5 is a horizontal section taken from a position indicated by line 5—5 in FIG. 4 and showing one of the devices of the present invention.

The device for resisting adhesion 10 of the present invention is shown in FIGS. 4, 5 and 6. It will be understood that the device 10 can be constructed in a wide variety of specific embodiments. The embodiment shown in FIGS. 4, 5 and 6 has particular operational advantages, but is otherwise merely representative of the wide variety of embodiments of the invention that can be employed for accomplishing the same purposes.

Each of the devices 10 of the preferred embodiment hereof has a metal interior sleeve 100 of a cylindrical configuration and is of the same height as the conventional spacing sleeve 72 already described. The interior sleeve has an interior cylindrical surface 101 defining a cylindrical shaft passage 102 dimensioned to be slip fitted about the mounting shaft 70, as shown in FIG. 6. The interior sleeve has an exterior cylindrical surface 103 and extends between an upper annulus 104 and an opposite, lower annulus 105.

The device 10 has an outer body 110 mounted on, and extending about, the exterior cylindrical surface 103 of the interior sleeve and between the upper annulus 104 and the lower annulus 105. The outer body is preferably constructed of a material having a low coefficient of friction, such as nylon or a synthetic plastic material of any of a variety of types. In the preferred embodiment, the outer body is constructed of high density polyethylene. The outer body is bonded on the exterior cylindrical surface 103 of the interior sleeve 100. More specifically, the outer body has an interior cylindrical surface 111 defining a cylindrical interior passage 112 which is mounted on the exterior cylindrical surface 103 of the interior sleeve 100 by any suitable means. The outer body has an upper surface 113 which is coplanar with the upper annulus 104 of the interior sleeve and an opposite, lower surface 114 which is coplanar with the lower annulus 105.

The outer body 110 has a smooth exterior surface 115 formed of opposite curved portions 116 which are joined on opposite sides of the outer body at apexes 117. In the assembled configuration shown in FIGS. 4, 5 and 6, the apexes 117 are disposed in spaced, parallel relation to the axis of rotation 71 and equal distances for opposite sides thereof as can be seen in FIG. 5.

OPERATION

The operation of the described embodiment of the subject invention is believed to be clearly apparent and is briefly summarized at this point.

Referring first, for comparative purposes, to the conventional construction shown in FIGS. 2 and 3, the spacing sleeves 72 are constructed of metal which inherently has a roughened exterior surface. During normal operation of the picking heads 34 of the mechanical cotton harvester 20, each of the cotton plants 23 passes into the picking head through the entrance 35 thereof. Within the interior 50 of the picking head 34, the rotating spindles 64 of the picking drum assembly 53 snare and remove the cotton fiber from the cotton boils 24. More specifically, the barbs 65 of the spindles snag the cotton fiber. The cotton fiber is carried on the spindles as the picking drum 60 rotates. The spindles pass in meshing relation between the doffer plates 80. The doffer plates of the doffer assembly 52 are rotated at a high rate of speed brushing, or pulling, cotton fiber from the spindles of the picking drum 60. The cotton fiber is drawn vacummatically downwardly within the interior of the picking head and through the air duct 36 and is ultimately deposited within the picker basket 37.

However, as previously noted, in conventional construction, over time, residual cotton fiber becomes entangled about the spacing sleeves 72 forming the wrap 90 shown in FIGS. 2 and 3. For example, the condition shown in FIGS. 2 and 3 in the case of conventional spacing sleeves might typically be the accumulated wrap from ten (10) to twelve (12) hours of harvesting operation. Continued operation of the cotton harvester without removal of the wrap reduces the effectiveness off the picking heads and ultimately can lead to damage of the internal working mechanisms of the picking heads. In order to remove this wrap, conventionally various hand tools are used in an attempt to cut or pull the wrap from the spacer sleeves of the doffer assemblies. This process typically takes a lengthy period of time to complete and must, of course, be performed on the doffer assemblies of all of the picking heads.

In contrast, the devices 10 of the present invention, which replace the conventional spacing sleeves 72, do not become entangled with substantially any cotton fiber during any equivalent period of operation. Rather, the devices resist such entanglement. This is depicted for illustrative convenience in FIG. 4, as contrasted with the conventional result shown in FIG. 2 for an equivalent period of operation.

This resistance to adhesion is achieved by the devices in several ways. The smooth exterior surface 115 of the outer body 110 of each device resists such adhesion even when the cotton fiber comes into contact therewith. In addition, since the material from which the outer body is constructed has a very low coefficient of friction, any such contact with cotton fiber is effectively repelled. As previously noted, in the preferred embodiment, the outer body is constructed of high density polyethylene. Furthermore, the configuration, which can best be visualized in FIG. 5, of the outer body 110 causes an air movement in the manner of a fan which tends to blow the cotton fiber away from the devices, thereby providing an additional means by which such entanglement is resisted. Still further the configuration tends to bat the cotton fiber away so as additionally to resist entanglement.

It has been found, during long periods of operation, that substantially no cotton fiber adheres to, and becomes entangled about, the devices 10, thus avoiding the need to perform maintenance which is periodically required with conventional doffer assemblies for removal of the cotton fiber to ensure optimum operation. As noted, the wrap 90, visible in FIGS. 2 and 3, with respect to conventional spacing sleeves, is a typical result from approximately twelve (12) hours of operation. Similarly, the lack of any wrap 90, as depicted in FIGS. 4 and 5, is representative of the condition in the operation of the device of the present invention also after twelve (12) hours of operation.

Therefore, the device of the present invention is particularly well suited to avoiding or, at very least, minimizing the entanglement of fibrous materials about the moving parts of machinery, such as mechanical devices adapted to handle such fibrous material; has particular application in use on harvesting equipment such as that employed in the harvesting of cotton; operates simply and inexpensively to resist adhesion by fibrous material; depending upon the particular embodiment of the invention employed, uses a plurality of operative means to achieve the desired resistance to adhesion; does not otherwise interfere with the normal operation of such machinery and is entirely compatible with conventional equipment; and is otherwise entirely well suited to achieving its operational results.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. A device for resisting adhesion by materials on a movable assembly adapted to be moved relative to a predetermined longitudinal axis, the device comprising a body member of a substantially fixed cross sectional configuration adapted to be mounted on said movable assembly at a position susceptible to said adhesion for movement relative to said longitudinal axis and wherein said cross sectional configuration of the body member is capable of incurring contact from said materials substantially without said adhesion resulting from such contact.

2. The device of claim 1 wherein said body member is constructed of a material having a low coefficient of friction.

3. The device of claim 1 wherein said body member has a smooth outer surface.

4. The device of claim 1 wherein said body member is adapted to be mounted on the movable assembly for movement therewith and has an outer surface composed of a pair of substantially smooth, curved surfaces for substantially encapsulating the movable assembly at said position susceptible to said adhesion.

5. The device of claim 1 in which said body member of said device is adapted to be mounted on the movable assembly substantially encapsulating said position susceptible to said adhesion for rotation with the movable assembly substantially about said longitudinal axis.

6. The device of claim 5 wherein the body member of said device has an outer surface having a lower coefficient of friction than the movable assembly at said position susceptible to said adhesion and a configuration defining axes of reference substantially parallel to said longitudinal axis.

7. The device of claim 6 wherein said configuration of the outer surface is composed of a pair of curved surfaces joined along courses substantially parallel to said longitudinal axis and on opposite sides thereof.

8. A device for resisting the adhesion of fibrous materials in a machine having an assembly mounted for rotation substantially about an axis of rotation and subjected to contact by said fibrous materials during normal operation of the machine, the device comprising:

A. an interior body member mounted on the assembly in fixed relation for rotation therewith substantially about said axis of rotation; and B. an outer body member mounted on said interior body member for movement substantially about said axis of rotation, said outer body member having a substantially smooth exterior surface encapsulating said axis of rotation and substantially parallel thereto, including a pair of curved segments joined at corresponding opposite ends thereof along ridges which are spaced substantially equal distances from and on opposite sides of said axis of rotation, said ridges being substantially parallel to the axis of rotation, whereby fibrous materials approaching said assembly are repelled by said device.

9. The device of claim 8 wherein said outer body member rotates substantially about said axis of rotation and the exterior surface thereof has a configuration which, during said rotation, creates an air current which tends to repel said fibrous materials from adhesion with the assembly.

10. The device of claim 9 wherein said outer body member is fabricated from a material having a lower coefficient of friction than said assembly.

11. The device of claim 10 in which said machine is a mechanical cotton harvester, said assembly is a doffer assembly in the picking head of the cotton harvester composed of a plurality of doffer plates mounted in stacked relation on a drive shaft and wherein a plurality of said devices are individually mounted on the drive shaft between adjacent doffer plates so as to space said adjacent doffer plates from each other, whereby the substantially smooth exterior surfaces of said devices are disposed to resist entanglement by cotton fibers approaching said drive shaft during rotation thereof.

12. The device of claim 11 wherein said outer body member is constructed of a synthetic material having a coefficient of friction lower than said drive shaft.

13. The device of claim 11 wherein said body member is constructed of high density polyethylene.

14. The device of claim 13 in which said doffer assembly, including said drive shaft and doffer plates, are rotated substantially about said axis of rotation as a unit and wherein said devices are assembled so as to form an integral part of said doffer assembly and compose part of said unit for rotation substantially about said axis of rotation.

* * * * *

UNITED STATES PATENT AND TRADEMARK OFFICE
CERTIFICATE OF CORRECTION

PATENT NO. : 5,997,975
DATED : December 7, 1999
INVENTOR(S) : RICHARD J. YRIBARREN It is certified that error appears in the above-identified patent and that said Letters Patent is hereby corrected as shown below:

Column 2, line 36, delete "effect" and substitute
---effects---;

Column 5, line 54, delete "boils" and substitute
---bolls---; and

Column 6, line 6, after effectiveness, delete "off" and substitute
---of---.

Signed and Sealed this

Eighteenth Day of July, 2000

Attest:

Q. TODD DICKINSON

Attesting Officer

Director of Patents and Trademarks